Oct. 25, 1966  H. BOER ETAL  3,281,687
APPARATUS FOR ANALYZING A SIGNAL HAVING A PLURALITY
OF PEAKS BY NORMALIZATION
Filed Oct. 31, 1962  2 Sheets-Sheet 1

INVENTORS:
HENDRIK BOER
ALBERTUS SCHURINGA
KEES KAMPMAN
BY: N. N. Kunitz
THEIR ATTORNEY

INVENTORS:
HENDRIK BOER
ALBERTUS SCHURINGA
KEES KAMPMAN

BY: *signature*

THEIR ATTORNEY

United States Patent Office 3,281,687
Patented Oct. 25, 1966

3,281,687
APPARATUS FOR ANALYZING A SIGNAL HAVING A PLURALITY OF PEAKS BY NORMALIZATION
Hendrik Boer, Albertus Schuringa, and Kees Kampman, Amsterdam, Netherlands, assignors to Shell Oil Company, New York, N.Y., a corporation of Delaware
Filed Oct. 31, 1962, Ser. No. 234,447
Claims priority, application Netherlands, Apr. 27, 1962, 277,715
4 Claims. (Cl. 324—103)

The invention relates to a method and an apparatus for analyzing a signal having a number of peaks. The signal is preferably an electrical signal, and if it is desired to analyze a signal of a different type, the signal is first converted into a corresponding electrical signal. If the signal to be examined is given as a curve, the curve should be played back as a function of the time so that an electrical signal is generated.

When shown in the form of a graph a signal with peaks is a curve which returns completely or partially to the base line two or more times. The present analysis may, however, also relate to a signal which, shown in the form of a graph, is a curve returning to the base line only once or not at all. In this case the peaks (in this instance artificial peaks) develop when the course of the curve is divided (or considered as divided) into parts by ordinates plotted at various points of the axis of the abscissa. The analysis then relates to the various areas (artificial peaks) below the curve which each time are defined by the curve, two ordinates and the base line.

The invention is especially important when the signal is derived from a detector used in carrying out a chromatographic, especially a gas-chromatographic separation.

The analyzing of a signal with peaks (a feature of the invention) consists in determining the contributions of the relevant peaks (generally the weighted contributions of the peaks) as part of the whole signal (normalization). An analysis of this type is known and is frequently used in chromatography. In the chromatographic separation of mixtures the results of the analysis are usually obtained in the form of a diagram. This diagram shows a number of peaks which correspond to the components contained in the mixture. The area of a peak in this diagram is a measure of the quantity of the relevant component in the mixture, at least when the chromatographic detector shows all components with the same degree of sensitivity. This, however, is not usually the case, so that after the various peak areas have been determined each one should still be corrected (weighted) for the specific behavior of the detector for the particular component in question. The sum of the various peak areas, possibly weighted, is then determined and finally each peak area, possibly weighted, is divided by this sum (normalization) in order to obtain the percentages of the various components in the starting mixture.

It should also be noted that it is not always necessary for all the peaks of the diagram to be included in the normalization. Some peaks (such as the air peak) do not belong to components of the starting mixture; sometimes peaks occur which are not of interest for analysis purposes and it may sometimes happen that certain peaks are so small that they have little or no influence on the whole, while it is also not essential to know their individual contributions. Whenever reference is made hereinafter to each peak which occurs in the signal only those peaks are meant which are important to the analysis and which are therefore covered by the analysis.

The method outlined above is time-consuming and is less suitable, or completely unsuitable for practical purposes when a plant or refinery is to be controlled or regulated, especially by automatic separation. In this case the result of the chromatographic analysis must be available in the shortest possible time, and preferably fully automatically.

For the normalization it is known to use an electrical computer circuit consisting of a number of parallel branches each branch containing an adjustable resistance CR and a fixed resistance P (which is designed as a potentiometer); there are at least as many branches as peaks (components of the mixture) included in the analysis. Each peak corresponds to a particular branch. The parallel branches are fed by a direct-current source having connected in series an adjustable resistance N. The current in each branch is substantially determined by the adjustable resistance CR of that branch; this is set at such a value that the current through the branch is inversely proportional to the sensitivity of the detector to the relevant component (the degree of sensitivity of the detector to a particular component of the mixture being defined as the output signal of the detector per unit of quantity of the said component).

The areas of the various peaks (i.e. the time integral of the signal for each individual peak) are then determined, e.g. by graphical integration. The potentiometer sliding contact of each resistance P is then set at such a value that the resistance between one end (the end common to all the potentiometers) of P and the sliding contact is proportional to the area below the peak concerned.

Each sliding contact is connected via a relatively high resistance H (high in relation to P) and a measuring instrument (M) to one terminal of a measuring instrument $M_t$ of which the other terminal is connected to the adjustable resistance N. Hence each measuring instrument M shows the current (partial current) taken from the relevant potentiometer and the measuring instrument $M_t$ shows the sum of all the partial currents. The different measuring instruments M and the measuring instrument $M_t$ are identical meters with scale of 0–100%.

The sum of the branch currents is so controlled by means of the adjustable resistance N, that the sum of the partial currents brings the meter $M_t$ to 100%. The percentage of the components of the mixture can then be read off on the meters M.

The use of this computer circuit, as described above, is of some assistance in calculating the percentages of the various components but the result of the analysis is not immediately available. It has now been made available by the method and apparatus of this invention, in which a similar electrical computer circuit is also used but in which the integration of the signal for the various peaks and the setting of the circuit take place simultaneously, and the normalization is also effected simultaneously or immediately thereafter.

According to the invention for each peak included in the analysis the time integral of the signal is determined either mechanically by means of an integrating motor or electrically. Whenever such a peak appears in the signal the relevant potentiometer of the circuit is mechanically connected to the integrating motor or, if it is electrically integrated, to a servomotor to which the electrical integration values are supplied. After the peak has passed the integrating motor or the servomotor is switched off, all in such a way that each of the various potentiometers reaches a final position which is a measure of the time integral of the signal for the corresponding peak.

In addition the voltage of the direct-voltage source used in the computer circuit is automatically controlled, preferably by means of a servomotor system, in such a way that the sum of the partial currents assumes a certain value which may be adjusted.

If an integrating motor is used the voltage of the direct-current source may be automatically controlled even during the period of analysis in such a way that during this period the current in the line of the computer circuit common to the various partial currents continuously assumes or at least tends to assume a certain value which may be adjusted.

The method according to the invention, and in particular the apparatus used in the method, will now be further described with reference to the drawings wherein.

Figure 1:
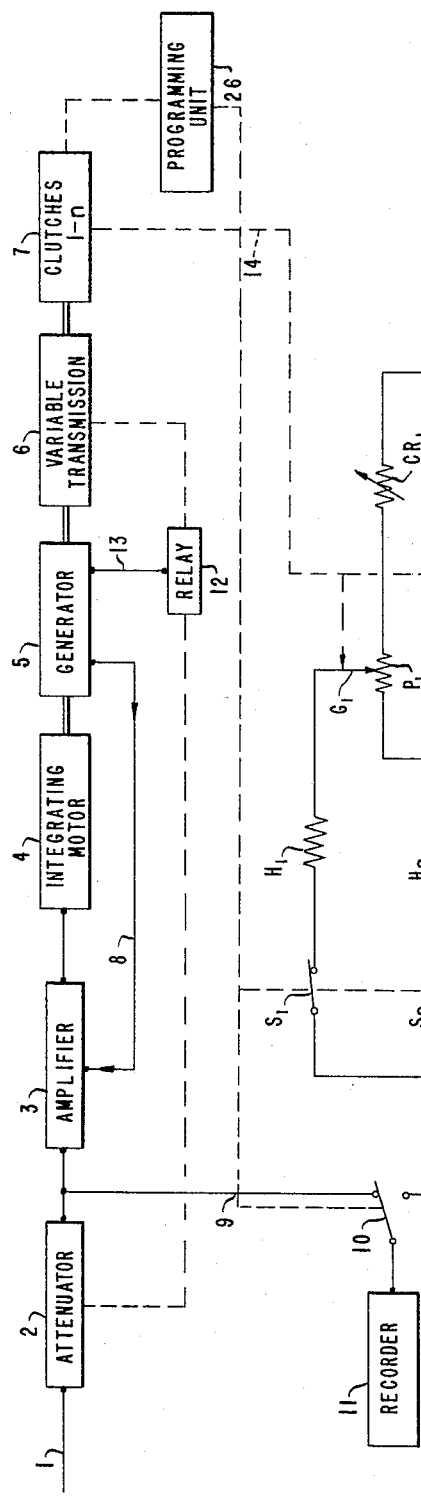
FIGURE 1 is a diagram of an apparatus for analyzing a signal with peaks, using mechanical integration of the peaks.
Figure 1:
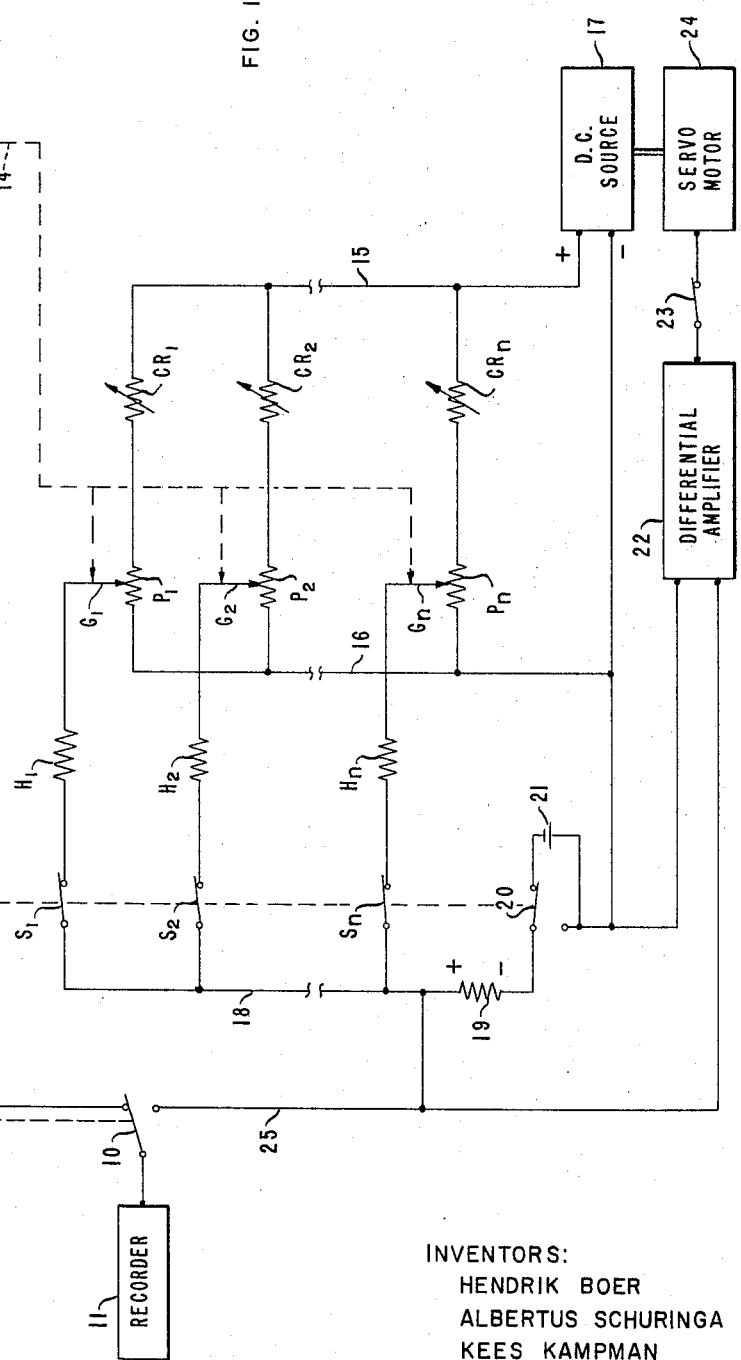

Referring to FIGURE 1, the electrical signal, which is for instance derived from a gas-chromatographic detector, is supplied via input terminal 1 to an attenuator circuit 2 and is passed via an amplifier 3 to the integrating motor 4. This motor is mechanically coupled to a generator 5; and the motor shaft is also connected, via an apparatus with variable transmission 6, to a clutch 7 which is preferably a magnetic clutch. The voltage produced by the generator is passed via a line 8 to the input of the amplifier 3 in such a way that there is a feed-back with respect to the signal with the object of establishing an optimum linear relationship between the magnitude of the signal supplied and the speed of rotation of the motor. The output voltage of the attenuator circuit 2 is moreover passed via a line 9 and a switch 10, to a recorder 11 which records the course of the signal as a function of the time. The generator voltage is also supplied to a relay 12 through a line 13. When the generator voltage exceeds a certain value the relay 12 switches on the attenuator circuit 2 and at the same time the relay increases the transmission ratio of the apparatus 6. When the voltage falls below a certain value the relay switches the attenuator circuit off again and simultaneously annuls the increase in the transmission ratio. The attenuation introduced by circuit 2 and the increase in the transmission ratio produced by transmission 6 are of equal magnitude; all this is to ensure accurate measurement whenever either large or small peaks occur. This feature of the apparatus, which is not always essential and for which, moreover, a number of variants may be used, is described in the copending application of Albertus Schuringa No. 234,491, filed October 31, 1962.

The magnetic clutch 7 may connect the driving shaft of the variable transmission apparatus 6 via a shaft 14, shown diagrammatically, successively to the sliding contact of one of the potentiometers $P_1, P_2 \ldots P_n$ belonging to the electrical computer circuit. The combination 7/14 consists, in fact, of a shaft with $n$ electromagnetic clutches, each belonging to one of the potentiometers by the energizing of one of these clutches, this shaft is coupled to the sliding contact of the relevant potentiometer.

The electrical resistance computer circuit has a number ($n$) of parallel branches, each branch being formed by one of the potentiometers $P_1 \ldots P_n$ connected in series with one of the adjustable calibration resistances $CR_1 \ldots CR_n$. There are at least as many branches as there are peaks included in the analysis. All the branches are of the same design and each of the corresponding resistances in these branches have (independently of their subsequent setting) at least substantially the same value as the other. The currents passing through the branches $P_1C_1, P_2C_2 \ldots P_nC_n$ are called branch currents. For the sake of simplicity three branches are shown in the drawing, although in the practical embodiment 10, 20 or even more may be present, and in general only the first branch will be further described hereinafter.

The various branches are connected by lines 15 and 16 to a common direct-current source 17. The sliding contacts $G_1 \ldots G_n$ of the potentiometers $P_1 \ldots P_n$ are each connected over a relatively high resistance $H_1 \ldots H_n$ and a switch $S_1 \ldots S_n$ via a line 18 to one terminal of a resistance 19. The currents running through the branches $G_1 \ldots G_n$ are called branch currents or partial currents. The sum of all the partial currents flows through the resistance 19. The other terminal of resistance 19 is connected by means of switch 20 either directly to the line 16 or through a source of constant voltage 21 to the line 16 and the direct-current source 17. In the circuit shown in the drawing the line 16 is connected to the negative pole and the line 15 to the positive pole of the source 17; under these circumstances the source of constant voltage 21 is connected with its negative pole to the resistance 19 and with its positive pole to line 16 (the poling could, however, equally well have been reversed).

The sum of the voltage over resistance 19 and the constant voltage of the source 21 is led to a differential amplifier 22. The output voltage of the amplifier 21 feeds, via a switch 23, a servomotor 24 which controls the voltage of the direct-current source 17.

The upper terminal (positive terminal) of the resistance 19 is connected over a line 25 to a contact of the switch 10 previously referred to.

In addition there is a programming unit 26 which commands the magnetic clutch 7 and the position of the various switches.

At the beginning (the reading-in of the signal) the switches are in the position shown in the drawing; the sliding contacts $G_1 \ldots G_n$ are all in the extreme left position. It is assumed that the moments at which the successive peaks of the signal come in are known, as is always the case when a known mixture is chromatographically analyzed. In practice this occurs for instance, when a certain product stream from plant or refinery product has to be continually analyzed, and specially when the analyzed result is used for regulating or automatically controlling the plant or refinery.

The programming unit 26 ensures that when the first peak appears the clutch 7 effects the mechanical connection of the motor 4 with the sliding contact $G_1$ via 6 and 14 in good time. The total angular displacement of the driving shaft of 6 between the appearance and disappearance of the first peak is a measure of the time integral of the signal corresponding to this peak, the sliding contact $G_1$ is displaced from its extreme left position by the motor via the magnetic clutch, in such a way that the resistance between the left end of potentiometer $P_1$ (line 16) and its sliding contact $G_1$ is a measure of the relevant time integral of the first peak. This displacement is proportional to the said angular displacement; the resistance of the potentiometer between line 16 and sliding contact $G_1$ should remain proportional to the displacement of $G_1$.

After the first peak is read-in, the programming unit 26 ensures that sliding contact $G_1$ is switched off and that sliding contact $G_2$ is connected to the motor in good time before the reading-in of the second peak, etc.

The resistances $CR_1 \ldots CR_n$ are set, usually immediately at the beginning of the analysis, at a value allowing for the degree to which each individual peak has to be weighted. In the present instance, for example, resistance $CR_1$ is set at such a value that the voltage over the whole potentiometer $P_1$ (as a result of the first branch current) is inversely proportional to the previously defined degree of sensitivity of the chromatographic detector to the component of the mixture producing the first peak in the detector signal, with increasing sensitivity of the detector to a particular peak, the value at which the corresponding branch stream has to be set should be lower. Since the present apparatus is generally used for a large series of analyses of the same type of mixture the various positions of the resistances $CR_1 \ldots CR_n$ are preferably preset. If desired, this setting may also be left to the programming unit which should therefore be provided with the relevant information to arrange which values of resistances $CR_1 \ldots CR_n$ should be read-in at which times and which should, of course, in some way be connected to or brought into connection with these resistances.

Each partial current is then a measure of the time integral of the signal for the corresponding peak weighted in relation to the degree of sensitivity of the detector, in other words a measure of the amount of the component (corresponding to the said peak) occurring in the mixture analyzed.

In the circuit arrangement shown the various partial currents are normalized into component-percentages immediately after the analysis begins. To this end the voltage of the direct-current source 17 is controlled by the servomotor system 22–24. Depending on the polarity of the input voltage of the amplifier 22, the motor 24 adjusts the voltage of source 17 to a higher or lower value; equilibrium is attained only if the input voltage of the amplifier 22 is zero; i.e. when the voltage over the resistance 19 (which results from the various partial currents) is equal to the constant voltage of the source 21.

At the beginning of the analysis there cannot be a state of equilibrium since each of the partial currents— and a fortiori the sum of those flowing through resistance 19—is then zero; the voltage of source 17 is then increased by the action of the servomotor system until the limiting value of voltage source 17 is reached. At a certain moment during the analysis, when more and more contacts $G_1$, $G_2$, etc. are being set, the current through resistance 19 increases to such a value that the voltage drop across resistance 19 is equal to the voltage of source 21. From this moment the servomotor 24 decreases the voltage of source 17 (and hence the currents through all the branches), in such a way that the current through R retains the value corresponding to a voltage drop across resistance 19 equal to the voltage of source 21. The voltage of the source 21 is in the present case preferably equal to the voltage corresponding to the full deflection of the recorder 11. At the end of the analysis therefore, there is a voltage drop across the resistance 19, as a result of the sum of all the partial currents, which in this case coresponds to the full deflection of recorder 11.

After the period of reading-in the signal the period of reading-out of the analysis results may begin immediately. The programming unit switches off the feed voltage of the motor 24 by opening the switch 23; all the switches $S_1 \ldots S_n$ are then opened; moreover the switches 10 and 20 are brought into their other position. The switches $S_1$ to $S_n$ are then successively closed and reopened. In this way the magnitude of each of the partial currents 1 to $n$ is successively recorded by the recorder 11; the deflection of recorder 11 shows immediately the percentage of the various components since the sum of the partial currents corresponded to the full scale deflection (100%) of the instrument.

If it should happen that all the peaks are smaller than 10% (in general $a\%$) of the full deflection of the recorder 11, then for instance 10% (or $a\%$) of the sum of all partial currents can be made to correspond to the full scale deflection. This affords a more exact indication. Simple values such as 1 or 10 are preferably selected for $a$, the choice being dependent on the percentage of the largest peak; other values, however, such as, 2, 5, 25 or 50 may also be selected. For these latter values special recorder-paper is generally used, the full deflection being equivalent to $a\%$.

On completion of the reading-out the programming unit 26 restores the original position of the equipment and the next analysis may begin.

The normalization of the partial currents by controlling the voltage of source 17 need not take place at the very beginning of the analysis; it may also be made to start later or to take place immediately after the signal has been read-in. The method described has the advantage in that the programming unit may be of a somewhat simpler design.

Since programming units are instruments known per se it is not necessary to illustrate further the performance of the various tasks which the programming unit has to carry out.

The potentiometer resistances may each be approximately 100Ω and the maximum values of the calibration resistances C each 200Ω; the high resistances H are each 100KΩ and the resistance R approximately 100Ω. The voltage of 17 varies between 0 and 15 volts; after normalization the voltage is approximately 5 to 10 volts. The direct-current source may derive its energy from a commercial supply via a rectifying circuit. The magnitude of the source of constant voltage may, for example, be 2.5 mv. and may be supplied by a Zener-diode circuit.

Figure 2:
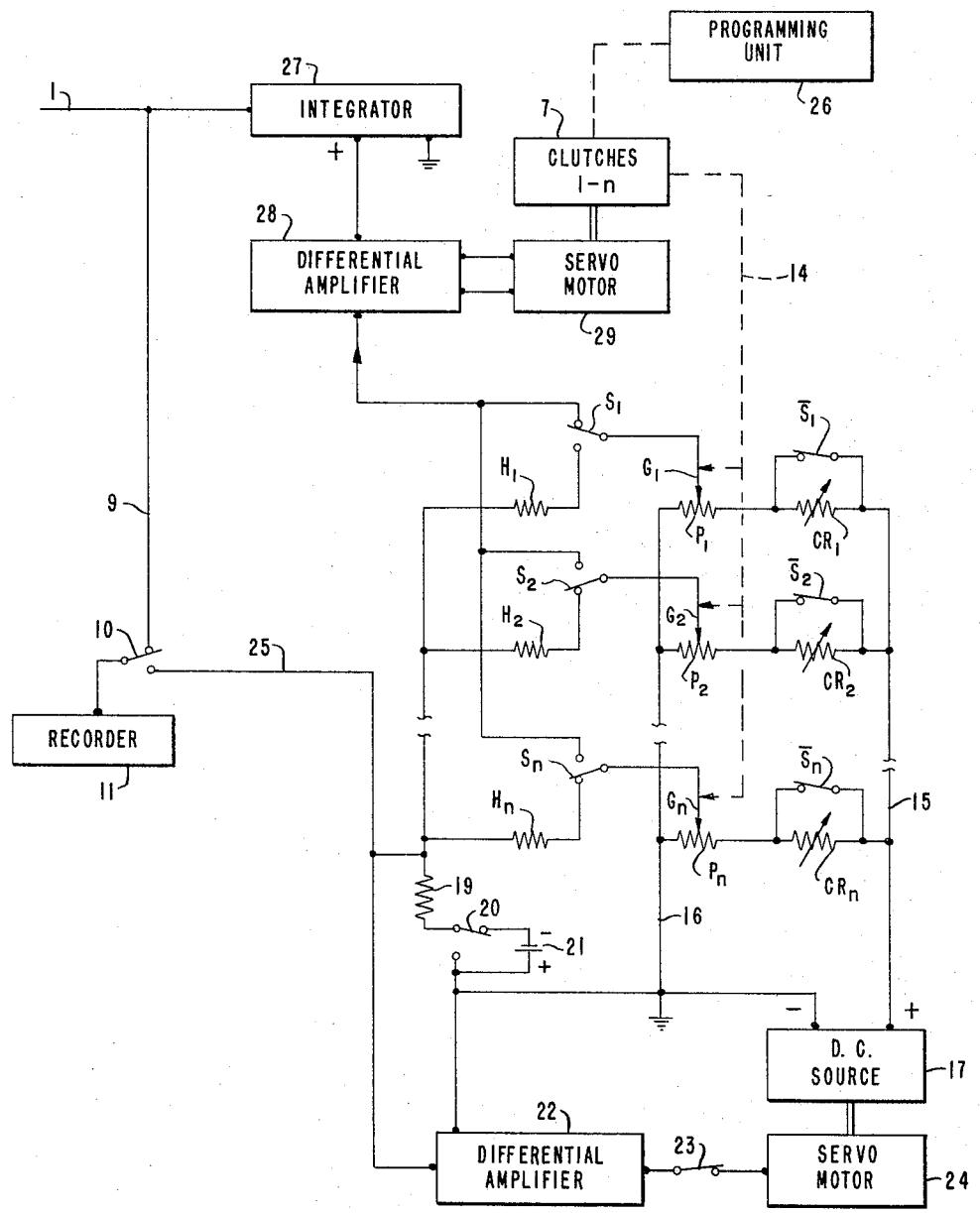
FIGURE 2 is a diagram of a similar apparatus, in which, electrical integration of the peaks is used.

Referring now to FIGURE 2, there is shown a circuit using electrical integration of the peaks.

The signal enters again at 1; the separate peaks are integrated in the integrator 27. The output voltage of integrator 27 is a signal the magnitude of which represents at any moment the time integral of the signal from the beginning of the peak until that moment. When the whole peak has passed, the output voltage of integrator 27 corresponds to the time integral taken over the whole peak. When a new peak appears the integrator is brought back to the zero position, e.g. by the programming unit, after which the procedure is repeated.

The signal derived from integrator 27 is passed via a differential amplifier 28 to a servomotor 29. In a practical embodiment this motor may have two windings, one connected to a power supply, and the other fed by the output voltage of the amplifier 28.

The motor 29 is mechanically connected in succession to the sliding contacts $G_1 \ldots G_n$ of the potentiometers $P_1$, $P_n$ by means of the magnetic clutch 7 (commanded by the programming unit 26). The drawing shows the position for reading-in the first peak of the signal in the first branch of the computer circuit.

The motor 29 brings the contact $G_1$ out of its original, extreme left position; with this movement this contact takes a portion of the voltage over the potentiometer $P_1$, which voltage is also passed via the switch $S_1$ (in its uppermost position), to the input of the differential amplifier 28. The two voltages i.e that derived from $G_1$ and that derived from the integrator 27, which are both supplied to the amplifier 28, should show the same polarity The motor 29 stops as soon as these two voltages are of equal value When the peak has passed, the position of $G_1$ corresponds to the time integral of the first peak in the same way as has been explained with reference to the embodiment of the invention shown in FIGURE 1. In the method of reading-in relating to FIGURE 2 all the other switches $S_2 \ldots S_n$ are placed in the lowest position so that only the first branch operates. In any case those switches S corresponding to the peaks already read-in, should all be reversed to the lowest position immediately after the reading-in: connection with the resistance 19 via the relatively high resistances H.

When reading-in there are two more points in the circuit which differ from the circuit shown in FIGURE 1. The resistances $CR_1 \ldots CR_n$ should all be placed in the same position, preferably in their minimum position, or, as is shown in FIGURE 2, short circuited by switches $\overline{S}_1 \ldots \overline{S}_n$. Moreover the direct-current source 17 should supply a very constant voltage during the reading-in. If these conditions are not met the reading-in of the signal is not exact. If switches $\overline{S}_1 \ldots \overline{S}_n$ are used in the calibration resistances $CR_1 \ldots CR_n$ may of course be set in advance at the desired values.

After the reading-in all the switches $\overline{S}_1 \ldots \overline{S}_n$ are opened. The normal function of source 17 is then restored. The normalization and reading-out of the results then takes place in the way described with reference to FIGURE 1.

In the design shown in FIGURE 2 the potentiometers need not have any linear course of resistance; in the starting position of the contacts $G_1 \ldots G_n$ there should, however, be no or substantially no resistance between the sliding contact and the line 16.

The circuit shown in FIGURE 2 could be used with a chromatographic separation, an ionization detector, e.g. a flame ionization detector, being used; in this case it is possible in principle to integrate the peak current by charging or discharging a condenser. The integrated signal is then supplied via an impedance converter to the differential amplifier (28). The signal from a heat conductivity detector might also be integrated by means of an integrating amplifier.

In the above the signal analysis according to the invention is mainly illustrated with reference to signals derived from a chromatographic detector although other signals with peaks, where the peaks play an individual part, such as spectra and statistical data, may also be analyzed in a similar way.

The control of the apparatus, insofar as it relates to the appearance and disappearance of a peak, need not necessarily be effected by means of a programming unit; it can also be carried out by a signal-slope detector which then takes over the function of the programming unit in this respect. A detector of this type is, of course, essential when the times of the peaks' appearance and disappearance are not known, or not precisely known, in advance. This detector may consist of a servomechanism operating a potentiometer the sliding contact of which follows the peak of the signal. On the shaft of the servomotor is provided a friction clutch which can entrain a strip between two mechanical stops lying close to each other. As soon as the motor starts to move (which happens whenever a peak begins) the strip interrupts the beam of light from a photo-electric relay. The relay then commands the present apparatus in such a way that the integration and reading-in of the peak may begin. When the highest value is passed the beam of light is again transmitted (this moment may be recorded for determining the retention time of a certain component); when a new peak begins the beam of light is again interrupted and the procedure is repeated. A special circuit ensures that the amplification of this detector is high when the signal has a low value and small when the signal has a high value.

It is also possible to derive from the circuit an indication relating to the absolute amount of all the analyzed components of the mixture together. The current (total current of all the branches) supplied by the direct-current source 17 is a measure thereof; the greater the amount of all the analyzed components of the mixture the smaller the current supplied by source 17. An indication of the magnitude of this current on the recorder 11 could therefore provide the desired information.

Since the shaft of the servomotor 24 generally drives a potentiometer of the source 17 and the position of this potentiometer is also a measure of the relevant current, this shaft may also be made to command a second potentiometer and this latter may be included in a separate circuit (not shown in the figures). The output voltage of this circuit may then be recorded by the recorder 11. It can also be ensured that the magnitude of this output voltage is inversely proportional to the magnitude of the total current supplied by the direct-current source 17.

Obviously, various modifications of the present invention are possible in view of the above teachings. It is therefore to be understood that the invention is not limited to the particular form illustrated but is capable of embodiment in other forms without departing from the spirit and scope of the appended claims.

We claim as our invention:

1. Apparatus for analyzing a signal having a number of peaks comprising:
   integration means for integrating the various peaks of the signal, said signal being supplied to said integration means, said integration means supplying a mechanical output proportional to the integrated value;
   a first source of D.C. voltage;
   a plurality of potentiometers, there being at least one potentiometer for each peak of the signal to be analyzed, said potentiometers being connected in a parallel arrangement to said source of D.C. voltage;
   a plurality of high impedances and switches connected in series, each of the sliding contacts of said potentiometers being connected to one of said high impedances and switches, all of said switches being connected to a common junction point;
   a source of D.C. reference voltage, one side of said D.C. reference voltage being connected in opposition to said first source of D.C. voltage;
   a resistance, one side of said resistance being connected to said common junction point, the other side of said resistance being connected to the other side of said D.C. reference voltage;
   a programming means, said programming means being coupled to said integrating means and the sliding contacts of said plurality of potentiometers, said programming means for each peak in the signal sequentially connecting the output of said integrating means to a different one of said sliding contacts to move one of said sliding contacts to a position along the potentiometer proportional to the integrated value for each of the individual peaks;
   said first D.C. source being connected to said potentiometers;
   a servo means, said servo means being connected to said first D.C. source to vary said first D.C. source, said servo means being responsive to the voltage across said resistor to vary the voltage of said first D.C. source until the voltage across said resistor equals the D.C. reference voltage;
   a recording means, a second switch means, said programming means being coupled to said second switch means and the switch means associated with the high impedances of the individual potentiometers to sequentially connect said potentiometers to said recording means to record the voltage across said potentiometers.

2. Apparatus as in claim 1 wherein said means for sequentially connecting the output of said integrating means to said sliding contacts comprises a plurality of clutch means, each of said clutch means being connected to a different one of said potentiometers; said programming means for selectively engaging said clutches.

3. The apparatus of claim 1 wherein said means to integrate the various peaks of the signal and to produce a mechanical movement proportional to the integrated value is a direct current motor.

4. The apparatus of claim 1 wherein said means to integrate the various peaks of the signal and to produce a mechanical output proportional to the integrated value comprises an electrical integrating circuit and a servo motor responsive to the output of said integrating means.

No references cited.

WALTER L. CARLSON, *Primary Examiner.*

R. V. ROLINEC, *Examiner.*

G. L. LETT, *Assistant Examiner.*